Feb. 22, 1972 — G. M. SESSLER ET AL — 3,644,605
METHOD FOR PRODUCING PERMANENT ELECTRET
CHARGES IN DIELECTRIC MATERIALS
Filed Feb. 11, 1969
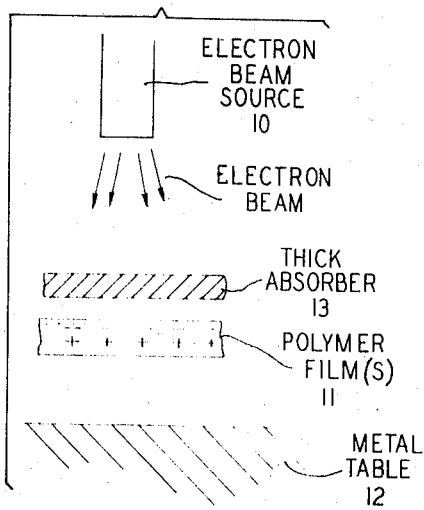
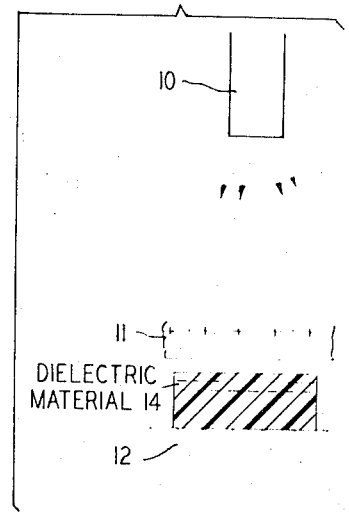
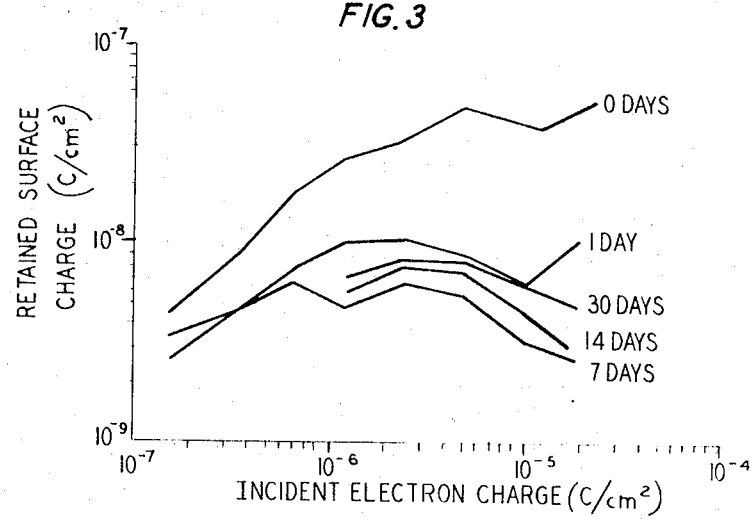
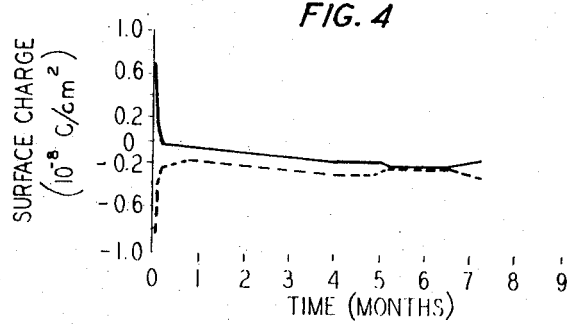
INVENTORS G. M. SESSLER
J. E. WEST
BY
G. E. Hirsch
ATTORNEY

United States Patent Office 3,644,605
Patented Feb. 22, 1972

---

3,644,605
METHOD FOR PRODUCING PERMANENT ELECTRET CHARGES IN DIELECTRIC MATERIALS
Gerhard M. Sessler, Summit, and James E. West, Plainfield, N.J., assignors to Bell Telephone Laboratories, Incorporated, Murray Hill, N.J.
Filed Feb. 11, 1969, Ser. No. 798,411
Int. Cl. H04r 7/00, 19/00
U.S. Cl. 264—22
1 Claim

---

ABSTRACT OF THE DISCLOSURE

Stable thin film electrets are produced by directing an electron beam on a dielectric material in a controlled fashion. Electron absorption in the film and induced secondary emission, both from the film and from an adjacent dielectric surface, aid in producing stable electrets with superior charge characteristics and very long lifetimes.

---

BACKGROUND OF THE INVENTION

This invention concerns the production of permanent electric charges in dielectric materials, and more particularly, to a method for permanently charging thin polymer films to produce electrets characterized by controlled and reproducible charge distribution, improved temperature resistance and stability, and by long lifetimes.

(1) Field of the invention

Dielectric materials in the form of thin films, for example, of various polymers such as polyesters, one of which is known by the brand name "Mylar," various fluorocarbons, such as the one available commercially under the brand name "Teflon," various polycarbonate resins, or the like, are used extensively in a variety of electroacoustic transducers, for the fabrication of capacitors, and for similar applications. In a typical electroacoustic transducer, such as an electrostatic microphone or earphone, a thin film of such a material is employed as the vibrating diaphragm. To avoid the need for external bias, the diaphragm film is permanently polarized or charged. Thin films of the material, typically films 0.25 to 0.5 mil in thickness, exhibit the necessary dielectric properties to support polarization for long periods of time.

(2) Prior art methods

Several methods of producing permanent electric charges on dielectric materials are known. The procedure most used employs the application of an electric field to a dielectric while it is subjected to a temperature cycle going from room temperature to an elevated temperature and back to room temperature. Due to charge alignment, charge separation, or charge injection, this method yields, in many cases, quasi permanent electrets characterized either by a heterocharge, a homocharge, or a combination of both charges. The time constants of the charge decay on such "thermoelectrets" range from fractions of a year up to thousands of years. While classical thermoelectrets were made from relatively thick wax disks, it has been shown more recently, in U.S. Pat. 3,118,022, that they can also be made of thin polymer films. Thin, prepolarized dielectric films are generally called "foil electrets."

Another known method consists of the application of light irradiation to certain photoconductive substances while exposed to an electric field. The "photoelectrets" made with this procedure have charge lifetimes covering the same range of values as thermoelectrets.

Yet another kind of electret can be obtained by β-ray irradiation or electron bombardment of dielectrics, either with or without simultaneous application of an electric field. Polarization in this case is achieved by absorption of electrons in the dielectric. Thick plates, which usually absorb most of the electrons available from radioactive sources or electron beam generators, have been used in experiments described in the literature. Little is known, however, about the decay characteristics of the charges on these "radioelectrets."

SUMMARY OF THE INVENTION

A method for permanently charging thin polymer films has been found which overcomes the major disadvantages of previous electret-forming procedures. In accordance with this invention an electron beam is used to bombard a polymer material to be charged in a unique environment that assures the presence of controlled secondary electron emission from both the material being charged and from an adjacent dielectric surface. In addition, back scattering from the auxiliary dielectric surface is developed which aids in the charging process. With this technique it is also possible to produce large and reproducible charges with long lifetimes on the dielectric which are then deposited in the polymer material without applying an electric field to the thin film being charged and without a particular temperature cycle.

In a typical charging arrangement used in practice, thin film "foil" electrets are produced by bombarding with an electron beam a polymer film or a plurality of films stacked together. The films are typically held in contact with or at a slight distance away from a dielectric support. Electron energies of about 1 mev. have been found to be satisfactory. Beams of this energy can be relatively easily produced with commercially available equipment. Beam intensities may be of the order of 1 $\mu$amp/sq. cm. These conditions assure controlled emission and back scattering from the adjacent dielectric surface, but do not cause appreciable heating or a breakdown in the auxiliary dielectric material. An exposure of about one second has been found to yield foil electrets with initial surface charge densities of about $10^{-7}$ to $10^{-8}$ C./cm.$^2$ and extrapolated time constants of charge decay of about 100 years.

The initial polarity of the charge on the thin film has been found to be positive on the surface facing the oncoming electron beam and negative on the other surface. After a few days the film frequently shows, on the surface which faced the electron beam, a charge reversal from positive to negative. Thus, the film becomes a "monocharge" electret with negative charge throughout. On the surface away from the electron beam exposure, the film exhibits a charge buildup with time over a certain period of the life of the electret charge.

A variation of the preferred method described above, has been found to yield acceptable results. The electron beam is slowed down by an absorber, for example, of aluminum, with a thickness comparable to or larger than the range of the electrons. Heretofore, absorbers, when used, were necessarily thinner than the range of electrons; indeed, it was not considered feasible to employ such thick absorbing material in the path of the electron beam. Yet, it has been found that some of the electrons penetrate the absorbing layer, emerge with a broad energy spectrum, impinge on the film or a plurality of films, are absorbed in the film, and/or cause secondary emission. The retained net charge on the film is usually opposite in sign to that observed on electrets made with the preferred embodiment of the invention (using a dielectric support), but this charge distribution is nonetheless maintained.

BRIEF DESCRIPTION OF THE DRAWINGS

The invention will be fully apprehended from the following detailed description of illustrative embodiments thereof, taken in connection with the appended drawings in which:

FIG. 1 illustrates schematically a suitable arrangement for preparing foil electrets in accordance with the invention;

FIG. 2 illustrates schematically a preferred arrangement for preparing foil electrets;

FIG. 3 shows the retained charge on a typical foil electret as a function of the incident electron charge using the preferred embodiment of the invention; and FIG. 4 illustrates charge decay on both surfaces of a foil electret, prepared in accordance with the preferred embodiment of the invention, and shows a change of sign illustrating the existence of a monocharge electret.

DETAILED DESCRIPTION OF THE INVENTION

An arrangement, in accordance with the invention, for preparing permanently charged foil electrets is illustrated in FIG. 1. An electron beam from source 10 is directed toward an auxiliary absorber layer 13. Beam energy from absorber layer 13 strikes the upper surface of a thin film layer or multiple layers of a polymer 11 supported above a metal table 12, or the like. Films of various polyesters, fluorocarbons and polycarbonate resins ranging in thickness from about ¼ to 1 mil respond to polarization by this method. Typically, the film is positioned about 15 centimeters from the beam source. Since permanent charging of a polymer film by an electron beam requires a charge deposition in or charge release from the film, a beam of carefully controlled energy must be employed. In accordance with the invention, an electron beam of about 1 mev., for example, from source 10, such as a Van de Graaff generator, or the like, is directed to impinge on the film. To control the energy of the beam and to assure that some electrons are absorbed by and cause secondary emission in the film, the beam is partly absorbed by auxiliary layer 13 which may, for example, be composed of sheets of aluminum of thicknesses together comparable to the range of velocity of electrons. This range is, for a monoenergetic electron beam with an initial electron energy above 0.6 mev., given by the relation $$R = 530E_0 - 106 \quad (1)$$

where R is the range in mg./cm.$^2$ and $E_0$ the energy of the incident electrons in mev. For 1 mev. electron, an absorber layer of aluminum about 1.65 mm. thick is satisfactory. Some electrons are capable of penetrating absorbers of this thickness and emerge with a broad spectrum of energies extending from 0 to $E_0$. This range of energies assures that a portion of the electrons is always absorbed by the film, regardless of the distance between absorber layer 13 and film 11 and regardless of atmospheric conditions. Typical beam currents for preparing electrets with this arrangement are 20–50 microamperes directed on areas of about 60 square centimeters. Exposure times of from 1 to 60 seconds have been found to be satisfactory.

In accordance with a preferred form of the invention, an electron beam is arranged to impinge on a polymer film which is placed in contact with or held at a distance up to about 1 centimeter above an insulating dielectric platform. Apparatus in accordance with the preferred embodiment is illustrated in FIG. 2. Here, an electron beam from source 10 is directed through film 11 into a plate of dielectric material 14 which, in the illustration, is supported on metal table 12. To assure that electrons are absorbed in the plate of dielectric material but do not pass through it, the plate is proportioned to exhibit a mass per unit area in excess of the range of the electron beam. Again the film is placed approximately 15 centimeters from the electron source and a beam intensity of approximately 1 microampere per square centimeter or less is employed to assure that there is no appreciable heating of the polymer film and that there is no breakdown in the dielectric support 14. Although a variety of dielectric materials are suitable for emitting electrons into the film, it has been found that a plate 14 of acrylic plastic, for example, of the form known commercially by the trademark "Plexiglas" is satisfactory. A plate about 1.25 cm. thick and slightly larger in surface area than the film being polarized may be used.

With the arrangement shown in FIG. 1, polarization in the foil generally consists of negative and positive charges on the upper and lower film surfaces, respectively. An opposite polarity is generally obtained with the arrangement shown in FIG. 2. After a few days, films polarized with the apparatus of FIG. 2 show, on the upper surface, generally a charge reversal from positive to negative, making a film a "monocharge" electret with negative space charge throughout. It has been found that after some initial decay on the lower surface, charged films exhibit a charge buildup with time over a certain period of the life of the electret charge.

The following phenomena are believed to be responsible for the observed charge behavior on foil electrets charged with the preferred embodiment. The primary electrons induce secondary emission from the upper surface of the film which produces a positive charge. The film is additionally exposed to secondary emission and back scattering from the dielectric support plate. The emitted secondaries, which have initially energies of only about 10 volts or less, are accelerated away from the plate by the strong electric field caused by electrons absorbed in the plate. This field also slows down the primary electrons, and results in more efficient trapping of deposited electrons in the film from the support plate. Due to the absence of heat, a dipole alignment, as found in thermoelectrets, is expected to be only of minor importance.

The charge reversal with time observed for the upper surface is caused by surface and volume recombination. The trapped primary and back scattered electrons, as well as the secondaries from the dielectric support, are distributed throughout the volume of the film while the positive charges due to secondary emission from the film are close to the surface. The positive charges are therefore subject to surface recombination with atmospheric charges. Recombination of the positive charges with trapped electrons (volume recombination) may also be of importance with respect to the observed charge reversal.

In the lower part of the film, the major contribution is believed to be from the secondary electrons and those back scattered and emitted from the dielectric support and trapped in the film. Secondary emission from the polymer is probably absent, due to the strong electrostatic field. There is, however, some ionization in the film followed by charge separation due to the field. Thus, some positive charges are expected close to the lower surface. In total, there is a surplus of negative charges in the lower part of the film. The charge increase, which is found frequently during the early lifetime of electrets, may again be attributed to recombination of deep seated electrons with positive charges located close to the surface.

Measurements of the net surface charge in coulombs per square centimeter (C./cm.$^2$) on foil electrets of socalled "Teflon FEP" prepared in accordance with the preferred embodiment of the invention are illustrated in FIG. 3 as a function of the total electron beam charge supplied by the electron source.

The effective surface charge decreases initially for the first week or so but then starts rising again due to the recombination process discussed above. After a few weeks, electrets polarized with higher electron energies generally retain less charge. This may be attributed to an increase of the conductivity after heavy electron bombardment. Typical variations of the surface charge density obtained for electrets made under identical conditions have been found to be within ±4%. This compares with deviations of more than ±10% in thermoelectrets.

FIG. 4 portrays the charge decay on both sides of a foil electret charged in accordance with the preferred method of the present invention. A thin film of so-called "Teflon FEP" is illustrated. For the initially negatively charged surface (dashed curve), charge decays first for a period of a few weeks, then rises for a period of about five months, after which it remains more or less constant. The charge on the other surface (solid curve), starts out positive, goes through zero and finally assumes negative values. The crossover evident in this figure confirms that a monocharge electret is formed, one having the same polarity on both sides of the foil.

Experiments have confirmed that the methods of electron beam polarization of this invention are capable of producing stable foil electrets with surface charges and decay time constants comparable to, or greater than, those of the best known electrets prepared by other methods. The difference between radio electrets and classical thermoelectrets is mainly in the physical nature of the polarization. While the charges on thermoelectrets are known to consist of aligned dipoles and of space charges, radio electrets possess only a space charge polarization. Since the time constant of the space charge decay is much longer than the dipole relaxation time, it is apparent that radio electrets are at least as stable as thermoelectrets. Moreover, the method of this invention may also be used to produce electrets with negative space charges throughout. In practice the polarization methods of this invention are much faster and yield much more reproducible results than known methods. Electron beam exposure times on the order of one second with no particular temperature considerations yield excellent results. Moreover, the deviation of surface charge densities on electrets polarized with an electron beam is by at least a factor of three smaller than deviations observed on thermoelectrets. It is, of course, evident that electron bombardment of a dielectric material, in accordance with the method of this invention, may be supplied from a variety of sources, e.g., a radioactive source, or the like.

What is claimed is:

1. The method of producing stable foil electrets by electron bombardment, the electrets being characterized by relatively permanent electric charges, which comprises the steps of:

supporting at least one thin film of polymer material in juxtaposition to a dielectric plate capable of trapping electrons and having a mass per unit area in excess of the range of incident electrons from a bombarding beam, said dielectric plate positioned substantially coextensively with the surface of said thin film polymer material;

exposing said thin film of polymer material to monoenergetic electron bombardment of sufficient energy for electrons to pass through said thin polymer film and to be trapped in said dielectric plate, but of insufficient intensity to cause appreciable heating or breakdown of said dielectric plate; and continuing said bombardment for a sufficient time to induce secondary emission, back scattering, and deposition of electrons from said dielectric plate into said polymer material in addition to the absorption of primary electrons by said thin polymer film, thereby to produce foil electrets having reproducible charge density.

References Cited

UNITED STATES PATENTS

| | | | |
|---|---|---|---|
| 2,763,609 | 9/1956 | Lewis | 264—22 X |
| 2,805,072 | 9/1957 | Smith | 264—22 X |
| 3,068,510 | 12/1962 | Coleman | 264—22 X |
| 3,102,303 | 9/1963 | Lainson | 264—22 X |
| 2,785,313 | 3/1957 | Trump | 250—49.5 |
| 2,858,442 | 10/1958 | Dewey | 204—158 |
| 3,055,006 | 9/1962 | Dreyfoos | 264—22 X |
| 3,170,008 | 2/1965 | Levine | 264—22 |

FOREIGN PATENTS

| | | | |
|---|---|---|---|
| 1,017,713 | 1966 | Great Britain | 204—158 |

OTHER REFERENCES

Olander, J. W., A Guide to Radiation Equiment, in Modern Plastics, Plastics Engineering, vol. 38, No. 10, pp. 105, 106, 109, 110, 113, 116, 119, 190, 192 and 197 relied on.

ROBERT F. WHITE, Primary Examiner

R. R. KUCIA, Assistant Examiner

U.S. Cl. X.R.

204—158; 250—49.5; 264—24